March 23, 1965  C. F. CALA  3,174,729
GLASS STIRRING MECHANISM
Filed Sept. 6, 1961  2 Sheets-Sheet 1
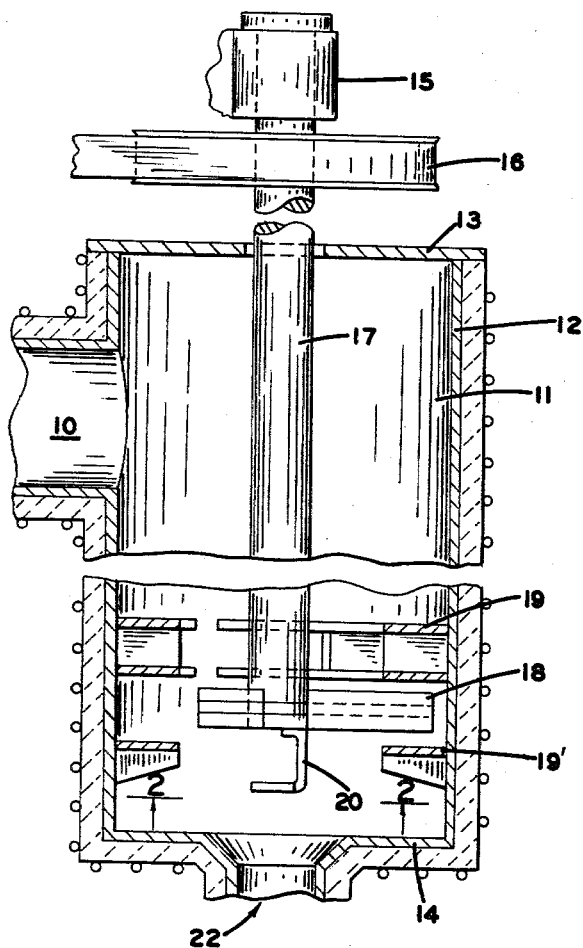
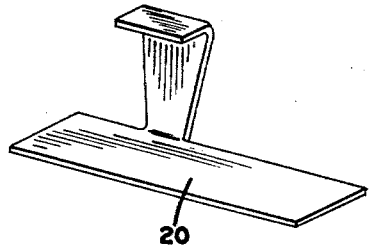
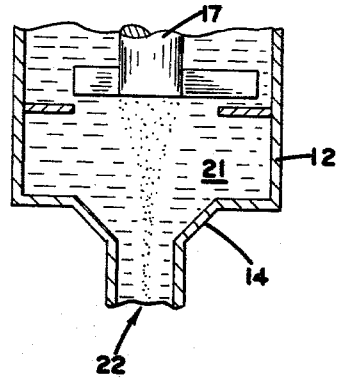
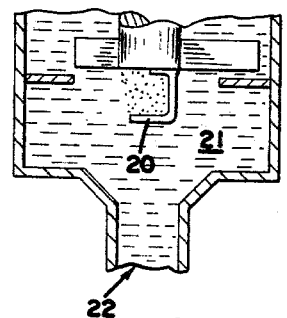
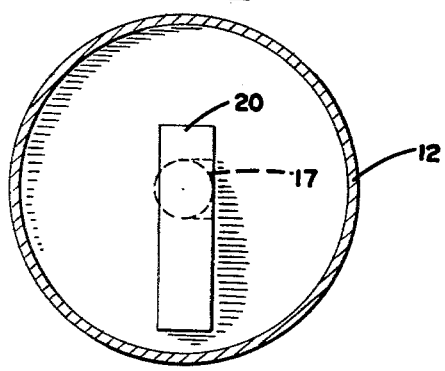
INVENTOR.
CHARLES F. CALA
BY Frank C. Parker
ATTORNEY March 23, 1965

C. F. CALA 3,174,729

GLASS STIRRING MECHANISM

Filed Sept. 6, 1961

CHARLES F. CALA
INVENTOR.

BY Frank C. Parker

ATTORNEY

United States Patent Office 3,174,729
Patented Mar. 23, 1965

3,174,729
GLASS STIRRING MECHANISM
Charles F. Cala, Irondequoit, N.Y., assignor to Bausch & Lomb Incorporated, Rochester, N.Y., a corporation of New York
Filed Sept. 6, 1961, Ser. No. 136,289
5 Claims. (Cl. 259—8)

This invention relates to glass stirring mechanism and, more particularly, to the homogenization of glass of optical quality in a continuous process.

In the manufacture of optical and ophthalmic glass by a continuous process, batch ingredients are heated in a melter or tank furnace usually constructed of non-metallic refractory material. As the batch ingredients melt, they give off gas which is dispersed throughout the molten mass of glass in the form of bubbles. The molten glass passes through a heat refining zone which is usually constructed of platinum and which is vented to the atmosphere. In flowing through this heat refining zone the bubbles gradually escape.

Immediately after the melting of the batch ingredients, the ingredients are not uniformly distributed in the molten glass and without mechanical mixing of some sort or another the resulting glass is chemically and optically inhomogeneous. Optical examination reveals the inhomogeneity which takes the form of striae. Because of the high viscosity of the molten mass of glass during the manufacturing process, diffusion alone does not make the striae disappear in the time available for the operation of the glass manufacturing. The striae actually comprise glass of a very slightly different refractive index from that of the remainder of the mass and optical glass of certain grades requires that the refractive index be uniform throughout the glass within .00001 unit. To obtain this necessary degree of uniformity in the refractive index throughout the mass of glass, the molten glass, as it comes from the refining chamber, is homogenized by mechanical stirring which acts to stretch or attenuate the striae and tends to minimize the noticeability thereof. The striae become thinner as a result of this mechanical stirring and are less noticeable.

These mechanical stirring devices have become well known and are now in common use in continuous process optical glass manufacturing. In some optical glasses, however, it has been found that with mechanical stirring devices of the type in general use there is still a tendency for a fine cord of striae to be formed in the glass as it leaves the stirring chamber. It is believed that this cord of striae comes into being along a line substantially beneath the rotatable stirring rod in the stirring chamber and arises because of the fact that the molten glass, as it passes beyond the stirring rod, is substantially all in rotation. At the bottom of the stirring chamber where the molten glass is drawn off, only the center of the glass is probably rotating due to contact between the glass in the outlet with the stataionary walls of the outlet. It seems that the cord of striae which forms in the glass must bear some relation to this believed motion pattern of the glass within the chamber outlet.

In any event, it has been found and the present invention provides a vane disposed beneath the lower end of the stirring chamber drive shaft which it is believed has the effect of shearing the molten glass just prior to its entry into the outlet. Consequently, it is felt, the glass beneath this vane is not subject to rotation but is permitted to merely subside or flow downwardly by gravity. Such glass having been thoroughly mixed and brought into a substantially homogeneous condition in the mixing chamber is not subject to the formation of striae due to the tendency to form a whirl in the center of the outlet. In any event, it has been found that when the glass stirring mechanism is constructed as contemplated herein, there is a very substantial minimizing of the formation of the cord of striae in the finished glass which is oftentimes present in glass formed by continuous processes and utilizing stirring chambers not having this extra shearing vane at the lower end thereof.

With the foregoing in mind, the present invention will now be described in detail with reference to the accompanying drawings, wherein:

FIG. 1 shows schematically an elevational view of a mixing chamber with the inlet from the refiner at the upper part thereof and the outlet from the chamber at the lower end thereof;

FIG. 2 is a sectional view taken substantially along the line 2—2 in FIG. 1 and looking in the direction of the arrows and shows the disposition of the shearing vane disposed at the lower end of the stirring rod;

FIG. 3 is a perspective view of the shearing vane shown in FIG. 2;

FIG. 4 is a schematic view illustrating the lower end of a glass stirring chamber and illustrating the formation of the cord of striae which oftentimes tends to form in glass manufactured by the use of stirring chambers and stirring rod assemblies of conventional construction; and FIG. 5 is a schematic view similar to FIG. 4 but illustrating the manner whereby it is believed the present structure is effective to break up the whirl at the center of the chamber and thus minimize the tendency for formation of the cord of striae in the outlet from the chamber.

Figure 8:
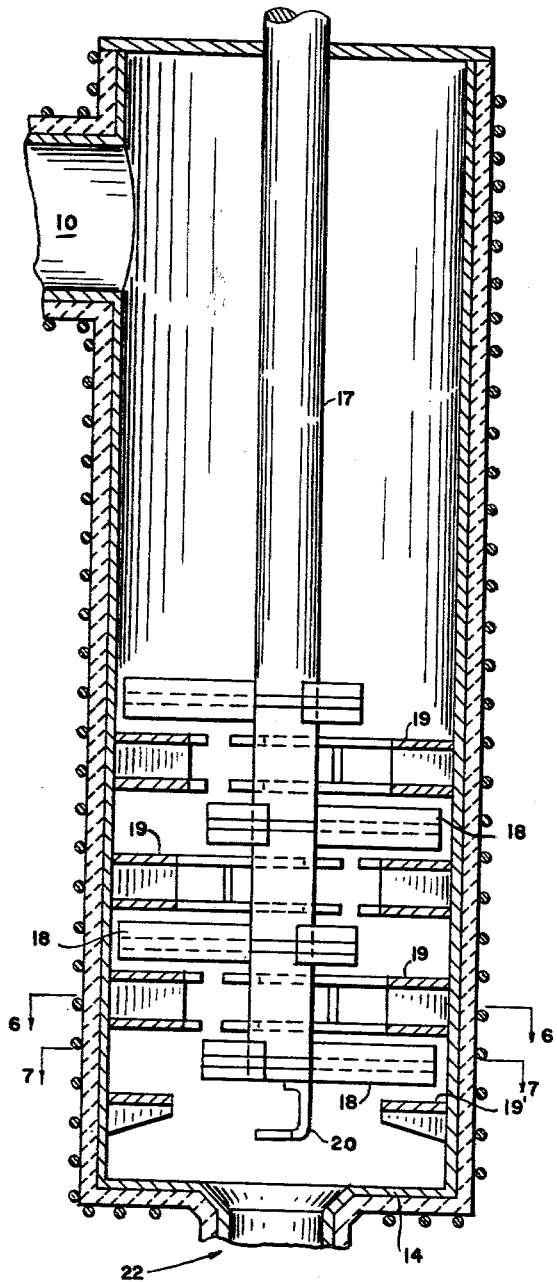
Figure 6:
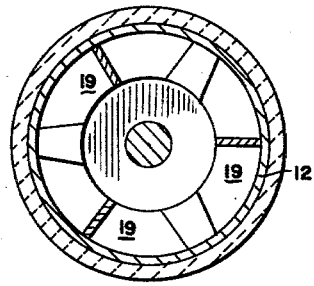
Figure 7:
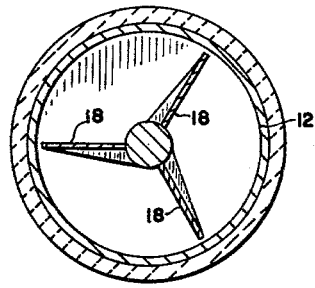

FIG. 6 is a sectional view of the shelves and is taken along the line 6—6 in FIG. 8;

FIG. 7 is a sectional view of the stirring blades and is taken along the line 7—7 in FIG. 8; and FIG. 8 is a view similar to FIG. 1 except showing all of the blades and shelves.

With reference now to the drawings, and with particular reference to FIG. 1, a molten glass inlet 10 leads into the top of a vertically disposed elongated chamber, indicated at 11. The exterior walls of the chamber 11 are preferably formed of a refractory ceramic material and the interior walls 12, top 13 and bottom 14 are preferably formed of either platinum or some metal comprising a mixture of platinum and rhodium which is capable of withstanding the high temperatures necessary within the chamber 11. Rotatably supported in a bearing 15 and provided with driving means 16 is a cylindrical rod or shaft 17 projecting downwardly and coaxially into the interior of the cylindrical chamber 11. A plurality of sets of blades 18 are integrally formed on shaft 17 and are alternately arranged between sets of shelves 19. As is apparent from the drawing the lower shelf 19' has only a top shelf portion whereas the shelves 19 have top and bottom shelf portions. It will be understood that the blades 18, shelves 19 and shaft 17 are also formed of platinum or some mixture of platinum and rhodium.

At the lower end of shaft 17, the present invention contemplates that an additional vane or blade 20 will be secured to the shaft 17. Preferably, the blade 20 is disposed off-center with respect to the shaft 17 and chamber 11 so that it acts, upon rotation of the shaft 17, to shear the molten glass 21 horizontally within the chamber 11 at a point just above outlet 22.

FIG. 4 illustrates what is believed to take place in a glass stirring chamber constructed without blade 20 disposed at the bottom of shaft 17. In such a device, the molten glass adjacent the inner walls 12 and bottom 14 of the chamber 11 tends to be substantially rotatably stationary, whereas, the molten glass within the central regions of the chamber 11 and the central region of outlet 22 is rotating or winding up, much in the form of a vortex. It is believed that this vortex or whirl becomes smaller as the glass reaches the exit opening of outlet 22 and forms an objectionable cord of striae, which is visible in the finished glass.

By utilizing the shearing blade or vane 20, which is preferably disposed off-center with respect to the shaft 17 and mixing chamber 11, it is believed that the flow of glass within the chamber and outlet is more like that depicted in FIG. 5. It is believed that the blade 20 is effective to shear or slice the mass of molten glass immediately above outlet 22 so that substantially none of the glass within the outlet 22 is caused to rotate as it subsides therein upon withdrawal of the molten glass from the bottom of the outlet 22. Thus, the vortex or whirl is not present in the molten glass within the outlet 22 and there is not the tendency to form the cord of striae which is present when blade 20 is not used at the bottom end of the stirring rod 17.

It is contemplated that other configurations of the blade 20 could be utilized which would sever the cord of striae and prevent the formation thereof within the glass and such changes are considered to be within the scope of the present invention.

What is claimed is:

1. Glass stirring apparatus comprising a vertically disposed elongated cylindrical chamber, an inlet adjacent the top thereof, an outlet at the lower end of the chamber, a drive shaft rotatably supported above said inlet and projecting axially and downwardly into said chamber, stirring means disposed in axially spaced relation within said chamber and rotatably driven by said shaft for stirring and homogenizing molten glass disposed within said chamber, and means disposed at the bottom of the chamber above said outlet and below the lower end of said shaft for severing the molten mass of glass within the chamber from the glass within said outlet and thereby being effective to minimize the formation of striae in the molten glass leaving said outlet.

2. Glass stirring apparatus comprising a vertically disposed elongated cylindrical chamber, an inlet adjacent the top thereof, an outlet at the lower end of the chamber, a drive shaft rotatably supported above said inlet and projecting axially and downwardly into said chamber, stirring means disposed in axially spaced relation within said chamber and rotatably driven by said shaft for stirring and homogenizing molten glass disposed within said chamber, and a blade secured below the lower end of said shaft and being rotatable with said shaft for severing the molten mass of glass within the chamber from the glass within said outlet and effective to minimize the formation of striae in the molten glass leaving said outlet.

3. Glass stirring apparatus comprising a vertically disposed elongated cylindrical chamber, an inlet adjacent the top thereof, an outlet at the lower end of the chamber, a drive shaft rotatably supported above said inlet and projecting axially and downwardly into said chamber, stirring means disposed in axially spaced relation within said chamber and rotatably driven by said shaft for stirring and homogenizing molten glass disposed within said chamber, and a blade secured below the lower end of said shaft and disposed in off-center relation with respect to the axis of said shaft and being rotatable with said shaft for severing the molten mass of glass within the chamber from the glass within said outlet and effective to minimize the formation of striae in the molten glass leaving said outlet.

4. Glass stirring apparatus comprising a vertically disposed elongated cylindrical chamber, an inlet adjacent the top thereof, an outlet at the lower end of the chamber, a drive shaft rotatably supported above said inlet and projecting axially and downwardly into said chamber, stirring means disposed in axially spaced relation within said chamber and rotatably driven by said shaft for stirring and homogenizing molten glass disposed within said chamber, and a substantially flat blade secured below the lower end of said shaft with its flat sides disposed substantially perpendicular to the axis of the shaft and in off-center relation with respect thereto and being rotatable with said shaft for severing the molten mass of glass within the chamber from the glass within said outlet and effective to minimize the formation of striae in the molten glass leaving said outlet.

5. Glass stirring apparatus comprising a vertically disposed elongated cylindrical chamber, an inlet adjacent the top thereof, an outlet at the lower end of the chamber, a drive shaft rotatably supported above said inlet and projecting axially and downwardly into said chamber, stirring means comprising a plurality of vanes disposed in spaced relation on said shaft and alternately arranged shelf means disposed in spaced relation on the inner surface of said chamber, said vanes and shelf means being effective upon rotation of said shaft and vanes for stirring and homogenizing molten glass disposed within said chamber, and a substantially flat blade secured below the lower end of said shaft with its flat sides disposed substantially perpendicular to the axis of the shaft and in off-center relation with respect thereto and being rotatable with said shaft for severing the molten mass of glass within the chamber from the glass within said outlet and effective to minimize the formation of striae in the molten glass leaving said outlet.

References Cited by the Examiner
UNITED STATES PATENTS 2,569,459   10/51   De Voe _____ 259—107 X
2,891,777   6/59    Gregorious _____ 259—134 X WALTER A. SCHEEL, *Primary Examiner.*

LEO QUACKENBUSH, *Examiner.*